United States Patent
Hoang et al.

(10) Patent No.: US 12,217,007 B2
(45) Date of Patent: Feb. 4, 2025

(54) PROVIDING A SEMANTIC ENCODING AND LANGUAGE NEURAL NETWORK

(71) Applicant: INTERNATIONAL BUSINESS MACHINES CORPORATION, Armonk, NY (US)

(72) Inventors: Thanh Lam Hoang, Maynooth (IE); Dzung Phan, Pleasantville, NY (US); Gabriele Picco, Dublin (IE); Lam Nguyen, Ossining, NY (US); Marco Luca Sbodio, Castaheany (IE); Vanessa Lopez Garcia, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 17/811,763

(22) Filed: Jul. 11, 2022

(65) Prior Publication Data

US 2024/0013003 A1    Jan. 11, 2024

(51) Int. Cl.
*G06F 40/30* (2020.01)
*G06F 40/126* (2020.01)
*G06F 40/205* (2020.01)
*G06F 40/279* (2020.01)
*G06F 40/40* (2020.01)
(Continued)

(52) U.S. Cl.
CPC ............ *G06F 40/30* (2020.01); *G06F 40/126* (2020.01); *G06F 40/205* (2020.01); *G06F 40/279* (2020.01); *G06F 40/40* (2020.01); *G06N 3/045* (2023.01); *G06N 3/08* (2013.01)

(58) Field of Classification Search
None
See application file for complete search history.

(56) References Cited

U.S. PATENT DOCUMENTS

| 2020/0250379 A1 | 8/2020 | Wang |
| 2021/0279606 A1* | 9/2021 | Srinivasan ............... G06N 5/04 |
| 2023/0351099 A1* | 11/2023 | Roy ..................... G06F 16/345 |

FOREIGN PATENT DOCUMENTS

| CN | 107526725 A | 12/2017 |
| CN | 109101584 A | 12/2018 |
| CN | 110275936 A | 9/2019 |

(Continued)

OTHER PUBLICATIONS

Cai et al., "AMR Parsing via Graph-Sequence Iterative Inference", Proceedings of the 58th Annual Meeting of the Association for Computational Linguistics, pp. 1290-1301, Jul. 2020, (12 pages).

(Continued)

*Primary Examiner* — Quynh H Nguyen
(74) *Attorney, Agent, or Firm* — Steven M. Bouknight

(57) ABSTRACT

Embodiments are provided for unsupervised learning of domain specific knowledge graph from textual data and language generation from knowledge graph via reinforcement learning in a computing system by a processor. Unstructured data is automatically parsed into one or more knowledge graphs based on the unstructured data and a list of candidate relations using a first machine learning model. Text data is generated from the one or more knowledge graphs using a second machine learning model.

17 Claims, 11 Drawing Sheets

(51) Int. Cl.
*G06N 3/045* (2023.01)
*G06N 3/08* (2023.01)

(56) References Cited

FOREIGN PATENT DOCUMENTS

| | | | |
|---|---|---|---|
| CN | 108427771 | B | 11/2020 |
| CN | 106980683 | B | 2/2021 |
| CN | 113065341 | A | 7/2021 |
| CN | 108197294 | B | 10/2021 |

OTHER PUBLICATIONS

Cao, Kun, "Unsupervised Construction of Knowledge Graphs From Text and Code", 15th International Workshop On Mining and Learning with Graphs, arXiv:1908.09354, Aug. 2019 (8 pages).

Schmitt et al., "An Unsupervised Joint System for Text Generation from Knowledge Graphs and Semantic Parsing", Accepted as long paper to EMNLP 2020, arXiv:1904.09447, 2020, (14 pages).

Lample et al., "Phrase-Based & Neural Unsupervised Machine Translation", EMNLP 2018, arXiv:1804.07755, 2018, (14 pages).

Niklaus et al., "A Survey on Open Information Extraction", 27th International Conference on Computational Linguistics, arXiv:1806.05599, 2018, (13 pages).

Ribeiro et al., "Investigating Pretrained Language Models for Graph-to-Text Generation", Accepted as a long paper to NLP4ConvAI, EMNLP2021, arXiv:2007.08426, 2021, (17 pages).

Mager et al., "GPT-too: A Language-Model-First Approach for AMR-to-Text Generation", Proceedings of the 58th Annual Meeting of the Association for Computational Linguistics, Jul. 2020, pp. 1846-1852, (7 pages).

Lee et al., "Pushing the Limits of AMR Parsing with Self-Learning", Findings of the Association for Computational Linguistics: EMNLP 2020, pp. 3208-3214, arXiv:2010.10673, Nov. 2020, (7 pages).

Fernandez Astudillo et al., "Transition-based Parsing with Stack-Transformers", Findings of the Association for Computational Linguistics: EMNLP 2020, pp. 1001-1007, Nov. 2020, (7 pages).

Ballesteros et al., "AMR Parsing using Stack-LSTMs", Proceedings of the 2017 Conference on Empirical Methods In Natural Language Processing, pp. 1269-1275, Sep. 2017, (7 pages).

Cai et al., "Core Semantic First: A Top-down Approach for AMR Parsing", EMNLP2019, arXiv:1909.04303, 2019, (12 pages).

Guo et al., "CycleGT: Unsupervised Graph-to-Text and Text-to-Graph Generation via Cycle Training", INLG 2020 Workshop, arXiv:2006.04702, 2020, (12 pages).

* cited by examiner

PROVIDING A SEMANTIC ENCODING AND LANGUAGE NEURAL NETWORK

BACKGROUND

The present invention relates in general to computing systems, and more particularly, to various embodiments for providing unsupervised learning of domain specific knowledge graph from textual data and language generation from knowledge graph via reinforcement learning in a semantic encoding and language neural network by a processor.

SUMMARY

According to an embodiment of the present invention, a method for providing unsupervised learning of domain specific knowledge graph from textual data and language generation from knowledge graph via reinforcement learning in a semantic encoding and language neural network in a computing environment, by one or more processors, is depicted. Unstructured data is automatically parsed into one or more knowledge graphs based on the unstructured data and a list of candidate relations using a first machine learning model. Text data is generated from the one or more knowledge graphs using a second machine learning model.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
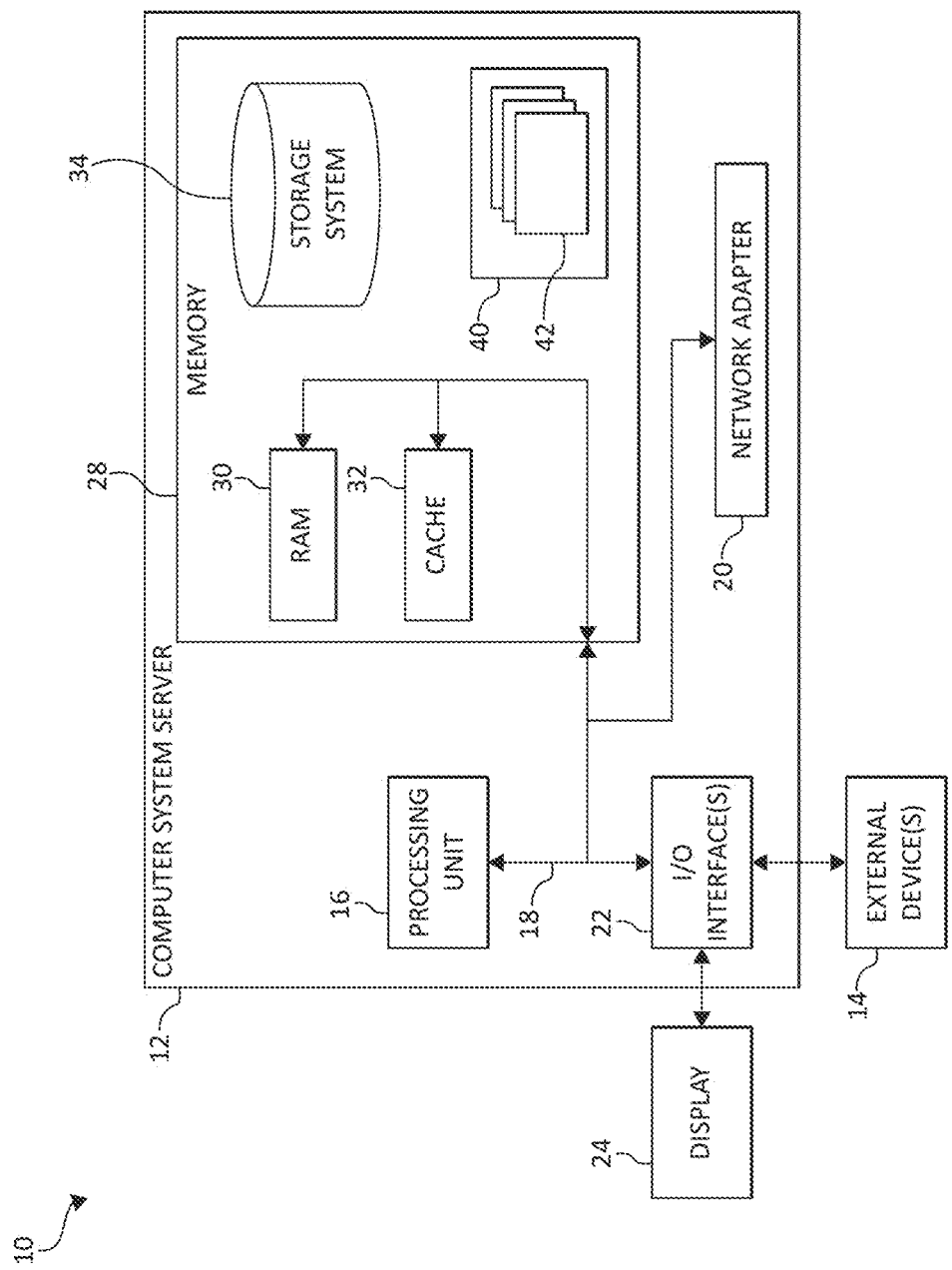
FIG. 1 is a block diagram depicting an exemplary cloud computing node according to an embodiment of the present invention.

The present invention relates generally to the field of artificial intelligence ("AI") such as, for example, machine learning and/or deep learning. Many computing systems may include Artificial neural networks ("ANNs") to perform computational tasks in a manner inspired by biological architectures of the nervous system. These networks are based on a principle of biological systems whereby neurons are interconnected via synapses which relay signals between the neurons. A biological neuron processes its input signals and generates output signals which are transmitted to other neurons via respective synapses. Artificial neural networks are based on a logical construction in which a succession of layers of neurons are interposed with layers of synapses, with each synapse interconnecting a respective pair of neurons in successive neuron layers. Signals relayed via synapses are weighted according to respective synaptic weights stored for the synapses. Weighted signals can thus be propagated over successive layers of the network from an input to an output neuron layer.

To learn powerful representations, neural networks may require a large amount of training data. However, for many real-world problems, it is not always possible to obtain sufficiently large, cleanly labeled datasets. Instead, a set of labeled training data that is limited in size and possibly with corrupted labels is used as training data, which may negatively affect a machine learning model performance. Although acquiring a large dataset is not difficult, accurate labeling of the data is expensive and an error-prone task and may requiring involvement of human interaction.

Moreover, information extraction from textual data is a critical artificial intelligence ("AI") task. For example, in some implementations, a system may turn unstructured textual data into structured data such as a knowledge graph, semantic graphs, abstract meaning representation ("AMR"), and/or syntactic trees such as syntactic dependency trees.

It should be noted that language generation is a task that generates texts from knowledge/semantic graphs or trees. Currently, these two natural language processing ("NLP") tasks require either labeled data, hand-crafted rules or with domain ontology. Creation of hand-crafted rules or domain ontology is tedious and prone to errors while acquisition of large-scaled labeled data is very expensive.

Thus, various embodiment are provided herein for unsupervised learning of knowledge graphs from textual data in a specific domain while providing for natural language generation from knowledge graphs. That is, the present invention provides for unsupervised learning of domain specific knowledge graph from textual data and language generation from knowledge graph via reinforcement learning in a semantic encoding and language neural network. In some implementations, a semantic encoding and language neural network is trained end-to-end using only input as text data via machine learning. In some implementations, a parser and language generation model for knowledge graph may be pretrained on domain data and fine-tuned on domain specific data without supervision.

In other implementations, the present invention provides an intelligent system for automatically parsing unstructured data into one or more knowledge graphs based on the unstructured data and a list of candidate relations using a first machine learning model; and generating text data from the one or more knowledge graphs using a second machine learning model. In some implementations, various embodiments described herein may perform an AI operation such as, for example, a natural language processing ("NLP") operation for providing unsupervised learning of domain specific knowledge graph from textual data and language generation from knowledge graph via reinforcement learning in a semantic encoding and language neural network.

In other implementations, the present invention provides an intelligent semantic encoding and language neural network that automatically parses text into knowledge graphs based on the unstructured text and input candidate relations, and generates texts from input knowledge graphs.

The intelligent semantic encoding and language neural network system may provide, as input, a text corpus and a list of candidate relations. The semantic encoding and language neural network system may use the given input to train two machine learning models in an unsupervised manner to perform the following tasks.

The first machine learning model is a semantic encoder. The semantic encoder is a neural network that takes as input a fragment of text. The semantic encoder may identify entities present in input text and outputs/generates a probability distribution over the relations for any pair of entities in the input text. The second model (e.g., a semantic decoder) is a neural network that takes as input a list of triples (e.g., subject, predicate, object) where the subject and object are entities and the predicate is a relation. The semantic decoder outputs a fragment of text describing the knowledge representing the triples.

The intelligent semantic encoding and language neural network system may apply a learning operation trained via a reinforce algorithm that is able to train both the semantic encoder and the semantic decoder neural networks end-to-end using the input text corpus and the candidate relations with unsupervised learning methods. The intelligent semantic encoding and language neural network system may receive texts and performs training by sampling the triples from an uncertain knowledge graph predicted by the semantic encoder. The sets of sampled triples may be used as input to the semantic decoder to output the texts. A loss between the input and out output text may be considered as penalty score to penalize the probability of the triples through which it adjusts the predicted probability given by the encoder to optimize the maximum likelihood objective.

The intelligent semantic encoding and language neural network system may use pretrained semantic encoder and decoder models on public domain or specific domain labelled data (if available) and initialize the networks with the pretrained weights, and then fine-tunes the network weights with domain specific data in using unsupervised training approaches.

The intelligent semantic encoding and language neural network system may detect candidate entities in the sentence and uses them as nodes of a constructed knowledge graph. The intelligent semantic encoding and language neural network system may parse new text data, during a testing phase, into knowledge graphs and generates texts from the knowledge graph, using the model trained with the operations.

It should be noted as described herein, the term "intelligent" (or "cognitive/cognition") may be relating to, being, or involving conscious intellectual activity such as, for example, thinking, reasoning, or remembering, that may be performed using a machine learning. In an additional aspect, cognitive or "intelligent may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "intelligent" may refer to a mental action or process of acquiring knowledge and understanding through thought, experience, and one or more senses using machine learning (which may include using sensor-based devices or other computing systems that include audio or video devices). Cognitive/intelligent may also refer to identifying patterns of behavior, leading to a "learning" of one or more events, operations, or processes. Thus, the intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term intelligent may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may use AI logic, such as NLP based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and intelligent; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human intelligent based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
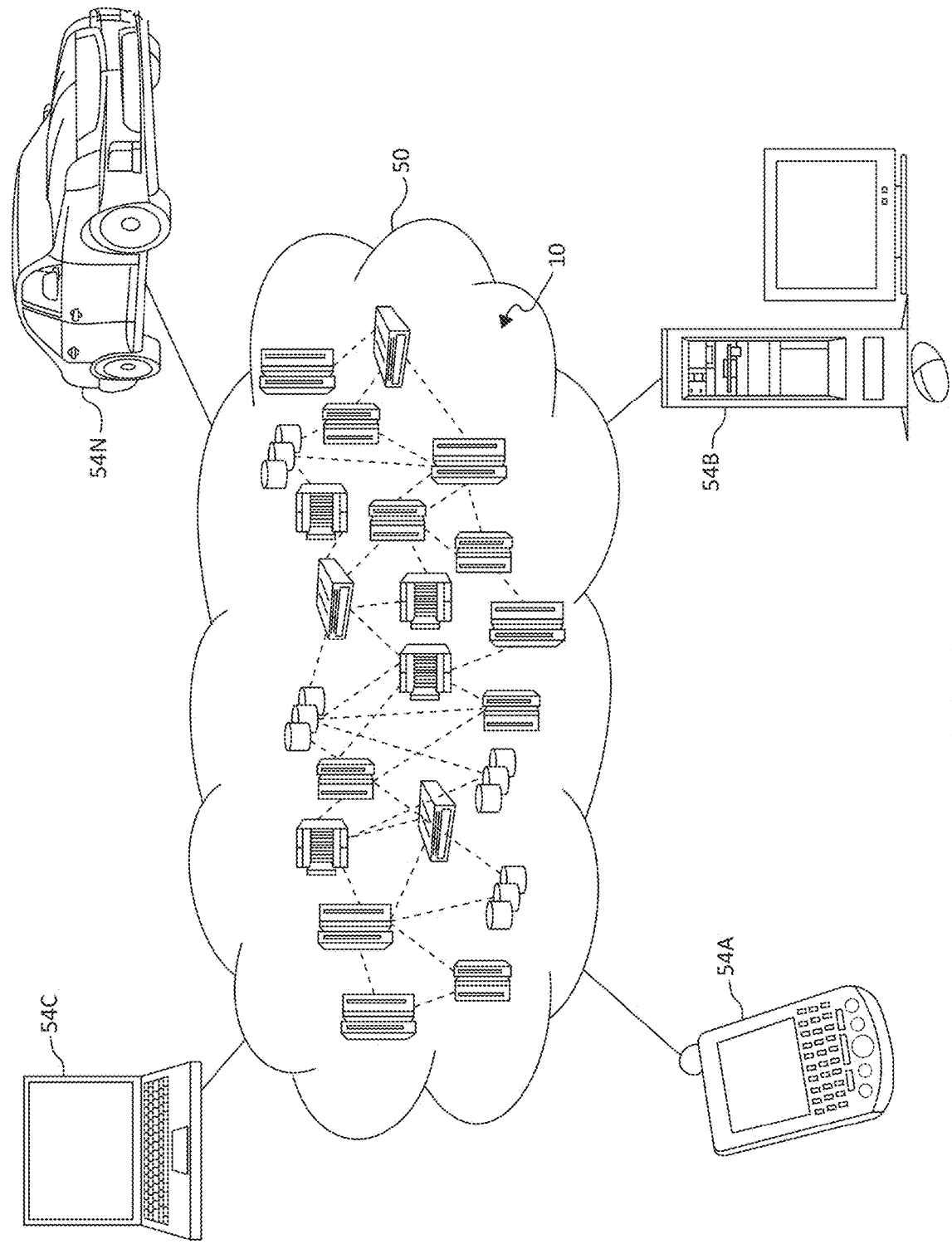
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
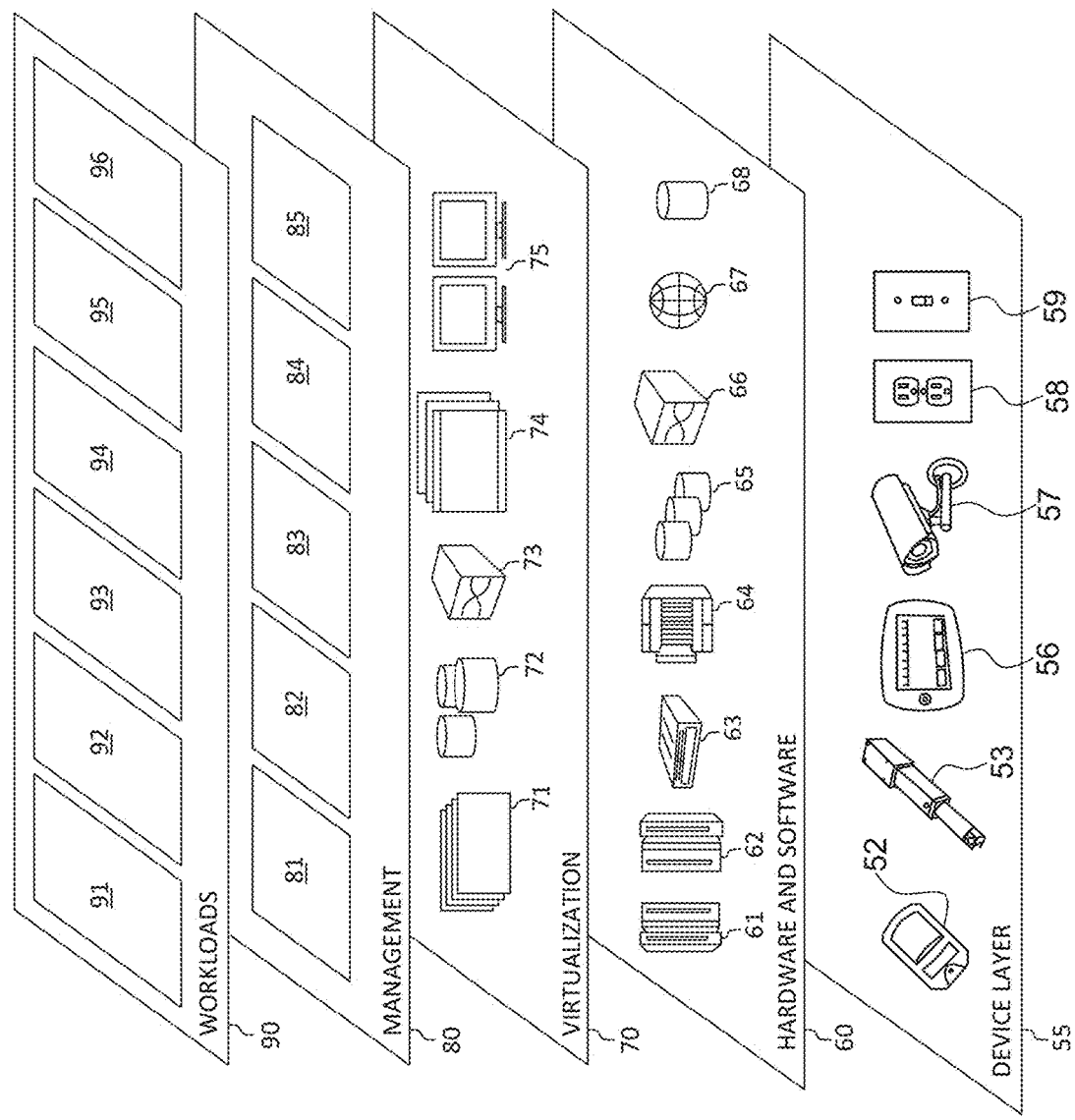
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing unsupervised learning of domain specific knowledge graph from textual data and language generation from knowledge graph via reinforcement learning. In addition, workloads and functions 96 for providing unsupervised learning of domain specific knowledge graph from textual data and language generation from knowledge graph via reinforcement learning may include such operations as data analytics, data analysis, and as will be further described, notification functionality. One of ordinary skill in the art will appreciate that workloads and functions 96 for providing a reasonable language model learning for semantic data in a knowledge graph may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
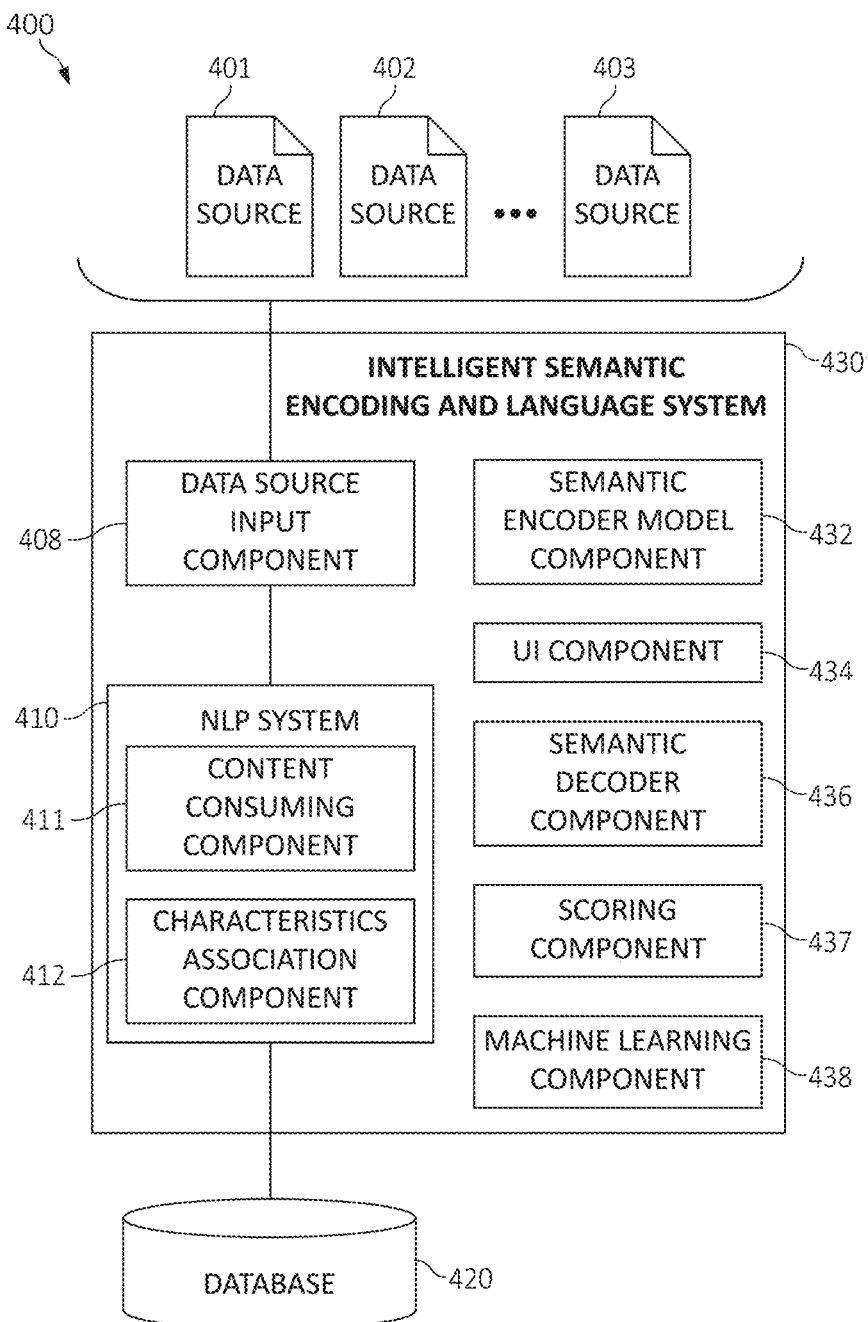
FIG. 4 is an additional block diagram depicting an exemplary functional relationship between various aspects of the present invention.

Turning now to FIG. 4, a block diagram of exemplary functionality 400 relating to unsupervised learning of domain specific knowledge graph from textual data and language generation from knowledge graph via reinforcement learning is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for intelligent application management in accordance with the present invention, such as those described in FIGS. 1-3. Many of the functional blocks 400 may execute as background processes on various components, either in distributed computing components, or on the user device, or elsewhere.

Multiple data sources 401-403 may be provided by one or more computing systems (e.g., servers, databases, storage systems, hardware systems, cloud computing systems, other software applications/components, network systems, etc.). The data sources 401-403 may be provide various sources of unstructured data such as, for example, files, records, software components, contextual data/information, tables, applications, or other elements/items associated with a software application/program. The group of data sources 401-403 are consumed such as, for example, using natural language processing (NLP) and artificial intelligence (AI) to provide processed content.

The data sources 401-403 may be analyzed by an NLP component 410 to data mine or transcribe relevant information from the content of the data sources 401-403 (e.g., the unstructured data) in order to display the information in a more usable manner and/or provide the information in a more searchable manner. The NLP component 410 may be provided as a cloud service or as a local service.

The intelligent semantic encoding and language system 430 may include the NLP component 410, a content consuming component 411, a characteristic association component 412, and a post-processing analytics component 450. The NLP component 410 may be associated with the content consuming component 411. The content consuming component 411 may be used for inputting, receiving, searching, or collecting various data (e.g., unstructured data) from the data sources 401-403 and running NLP and AI tools against them, learning the content, such as by using the machine learning component 438. It should be noted that other components of FIG. 4 may also employ one or more NLP systems and the NLP component 410 is merely illustrated by way of example only of use of an NLP system. As the NLP component 410 (including the machine learning component 438) learns different data and/or sets of data, the characteristics association component 412 (or "intelligent characteristics association component") may use the artificial intelligence to make associations or links between various data or other software components of the data sources 401-403 by determining common concepts, methods, features, systems, licenses, similar characteristics, and/or an underlying common topic.

As used herein "intelligent" (e.g., cognition or "AI") is the mental process of knowing, including aspects such as awareness, perception, reasoning and judgment. An AI system uses artificial reasoning to interpret the data sources 401-403 (e.g., the unstructured data) and extract their topics, ideas, or concepts. The learned software, software components, software applications, tables, records, files, concepts, suggestions, topics and subtopics of a domain of interest, may not be specifically named or mentioned in the data sources 401-403 and is derived or inferred by the AI interpretation. In one aspect, one or more of the data sources 401-403 may be a knowledge domain.

The learned content of the data sources consumed by the NLP system may be merged into a database 420 (and/or knowledge store) or other data storage method of the consumed content with learned entities, concepts, methods, and/or features of the data sources 401-403 providing association between the content referenced to the original data sources 401-403.

The database 420 may maintain a timestamped record of all interactions and contributions of each software component, software license, software signature file, contextual information, software content contributor/administrator, criteria, subject, topic, or idea. The database 420 may record and maintain the evolution of software components, changes, adjustments, software licenses, software signature files, contextual information, software content contributors/administrators, criteria, subject, topic, or idea indicated, analyzed, identified, tagged, or discussed in the data sources 401-403.

The database 420 may track, identify, and associate all activity, events, changes, software updates, software decommissions, software component, software license, software signature file(s), contextual information, software content contributor/administrator, criteria, subject, topic, or idea and the like of all data generated during all stages of the development, retention, or decommission or "life cycle" of the decisions, decision elements, alternatives, choices, criteria, subjects, topics, or ideas. The merging of the data into one database 420 (which may include a domain knowledge) allows the intelligent semantic encoding and language system 430 to act like a search engine, but instead of keyword searches, it will use an AI method of making intellectual associations between the data sources using the deduced concepts.

The intelligent semantic encoding and language system 430 may include a user interface ("UI") component 434 (e.g., an interactive graphical user interface "GUI") providing user interaction with the indexed content for mining and navigation and/or receiving one or more inputs/queries from a user. More specifically, the user interface component 434 may be in communication with a wireless communication device 455 (see also the PDA or cellular telephone 54A, the desktop computer 54B, the laptop computer 54C, and/or the automobile computer system 54N of FIG. 2.) for also providing user input for inputting data such as, for example, queries to issue to data sources 401-403. The wireless communication device 455 may use the UI component 434 (e.g., GUI) for providing input of data and/or providing a query functionality such as, for example, interactive GUI functionality for enabling a user to enter a query in the GUI 422 relating to a software application, software retentions/decommissions, software components, software license, software signature files, contextual information (e.g., data linking software applications and associated files, records, information) software content contributor/administrator data, feedback data, criteria, domain of interest, topic, and/or an associated objective. For example, GUI 422 may display a query relating to whether or not a selected application may be decommissioned with one or more associated query results/answers.

The intelligent semantic encoding and language system 430 may also include a semantic encoder model component 432 and a semantic decoder component 436. The semantic encoder model component 432 and the semantic decoder component 436 may be used to identify one or more data sources 401-403 associated with each of a plurality of applications in one or more internal and/or external computing systems. The semantic encoder model component 432 and the semantic decoder component 436 may be used to define that one or more data sources (e.g., data sources 401-403) include unstructured/non-structured data in the computing system and that the one or more data sources (e.g., data sources 401-403) is associated with one or more of the plurality of applications.

In one aspect, once the NLP component 410 has carried out, the semantic encoder model component 432 and the semantic decoder component 436, in association with the NLP component 410, may link software components, software applications, contextual information, and other data, records, files, and information and may mine the data sources 401-403 and/or the database 420 of the consumed content to assist the ranking component to rank each of the software applications.

The intelligent semantic encoding and language system 430 may also include a scoring component 437 and a machine learning component 438. In some implementations, the intelligent semantic encoding and language system 430, using the semantic encoder model component 432, the semantic decoder component 436, the scoring component 437, and/or the machine learning component 438, may provide unsupervised learning of domain specific knowledge graph from textual data and language generation from knowledge graph via reinforcement learning in a semantic encoding and language neural network by 1) automatically parse unstructured data into one or more knowledge graphs based on the unstructured data and a list of candidate relations using a first machine learning model, and 2) generate text data from the one or more knowledge graphs using a second machine learning model.

The intelligent semantic encoding and language system 430 may also include a scoring component 437 and a machine learning component 438. In some implementations, the intelligent semantic encoding and language system 430, using the semantic encoder model component 432, the semantic decoder component 436, the scoring component 437, and/or the machine learning component 438, may train the first machine learning model and the second machine learning model using the unstructured data and a list of candidate relations via unsupervised machine learning using the unstructured data and the list of candidate relations, wherein the first machine learning model is a semantic encoder and the second machine learning model is a semantic decoder.

The intelligent semantic encoding and language system 430 may also include a scoring component 437 and a machine learning component 438. In some implementations, the intelligent semantic encoding and language system 430, using the semantic encoder model component 432, the semantic decoder component 436, the scoring component 437, and/or the machine learning component 438, may use the first machine learning model to identify the plurality of entities in the unstructured data; and encode the unstructured data into a distribution of a plurality of triples in the one or more knowledge graphs.

The intelligent semantic encoding and language system 430 may also include a scoring component 437 and a machine learning component 438. In some implementations, the intelligent semantic encoding and language system 430, using the semantic encoder model component 432, the semantic decoder component 436, the scoring component 437, and/or the machine learning component 438, may use the second machine learning model to identify a set of the plurality of triples of the one or more knowledge graphs; and decode the set of the plurality of triples into the text data, wherein a triple includes a subject, object, and predicate in the unstructured data, wherein the subject and object are an entity and a predicate is a relation.

The intelligent semantic encoding and language system 430 may also include a scoring component 437 and a machine learning component 438. In some implementations, the intelligent semantic encoding and language system 430, using the semantic encoder model component 432, the semantic decoder component 436, the scoring component 437, and/or the machine learning component 438, may sample a set of the plurality of triples from the unstructured data of one or more knowledge graphs for training a plurality of machine learning models via unsupervised machine learning.

The intelligent semantic encoding and language system 430 may also include a scoring component 437 and a machine learning component 438. In some implementations, the intelligent semantic encoding and language system 430, using the semantic encoder model component 432, the semantic decoder component 436, the scoring component 437, and/or the machine learning component 438, may generate text data from the set of the plurality of triples applying using the second machine learning model; and assign a penalty score to the set of the plurality of triples based on a degree of differences between the unstructured data and the text data.

The intelligent semantic encoding and language system 430 may also include a scoring component 437 and a machine learning component 438. In some implementations, the intelligent semantic encoding and language system 430, using the semantic encoder model component 432, the semantic decoder component 436, the scoring component 437, and/or the machine learning component 438, may identify one or more candidate entities in the unstructured data; and use the one or more candidate entities as nodes in the one or more knowledge graphs.

The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5A:
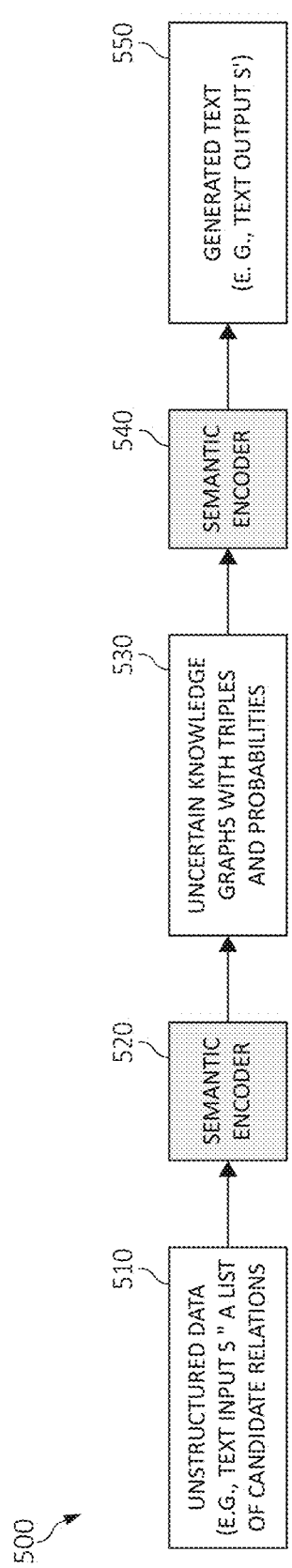
FIG. 5A-5B are block diagrams depicting operations for providing unsupervised learning of domain specific knowledge graph from textual data and language generation from knowledge graph via reinforcement learning in a semantic encoding and language neural network in a computing environment according to an embodiment of the present invention.
Figure 5B:
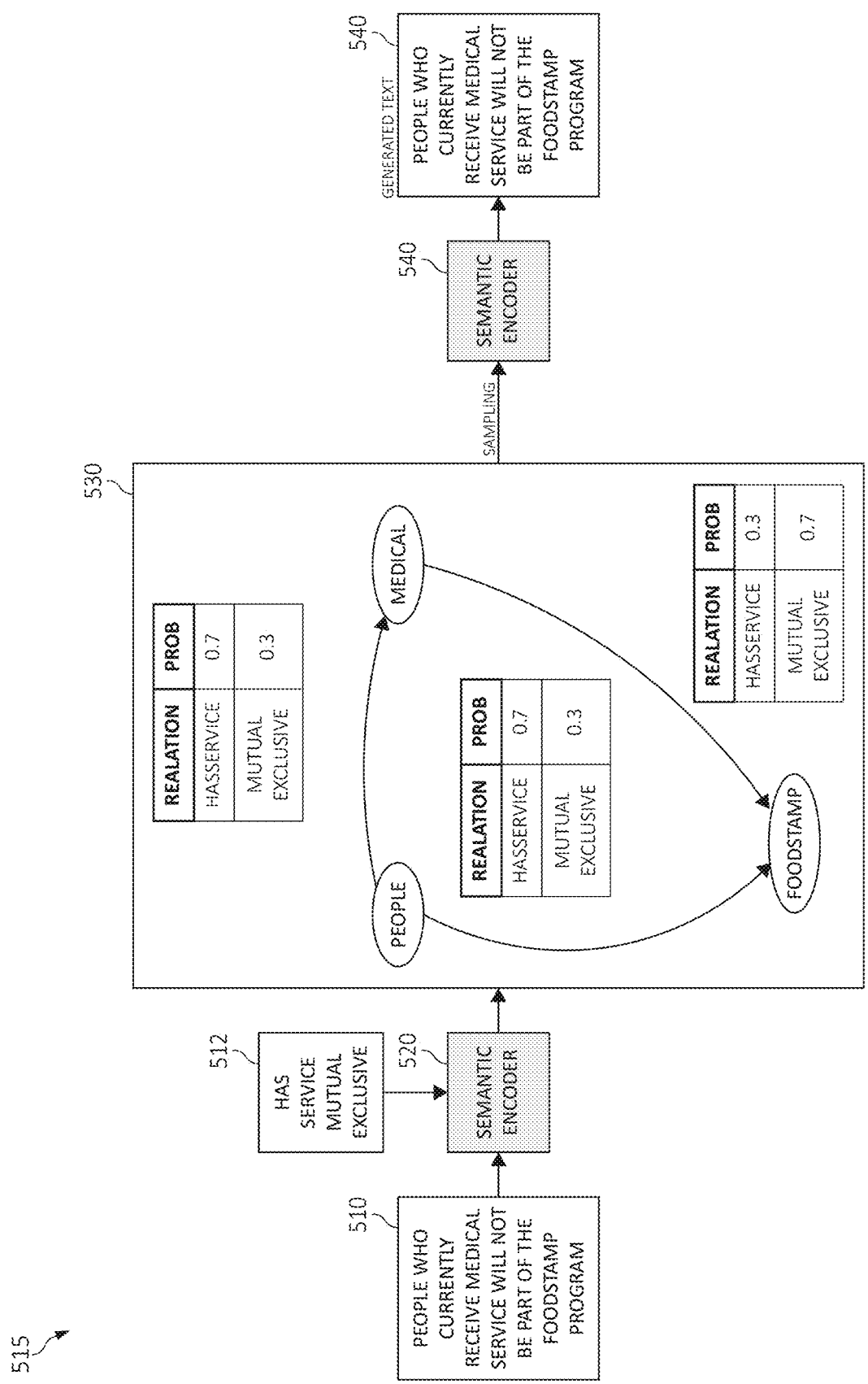

For further explanation, FIG. 5A-5B are block diagrams 500 and 515, respectively, depicting operations for providing unsupervised learning of domain specific knowledge graph from textual data and language generation from knowledge graph via reinforcement learning in a semantic encoding and language neural network in a computing environment according to an embodiment of the present invention. Also, one or more components, functionalities, and/or features of FIGS. 1-4 may be implemented in FIGS. 5A-5B. Repetitive description of like elements, components, modules, services, applications, and/or functions employed in other embodiments described herein is omitted for sake of brevity.

As depicted in FIG. 5A, semantic encoding and language neural network is provided that includes a semantic encoder 520 and a semantic decoder 540. The semantic encoding and language neural network is an auto-encoder neural network that encodes texts into a distribution of triples and decodes these triples back into texts. The network includes two components: 1) the semantic encoder 520 that receives as input data 510 (e.g., unstructured data such as, for example, a fragment of text (indicated as text input S")) and a list of candidate relations.

The semantic encoder 520 outputs a distribution over all possible triples can be created from the text with the given domain specific candidate relations. For example, the semantic encoder 520 generates output data such as, for example, one or more uncertain knowledge graphs 530 with triples and probabilities (e.g., a relation and probabilities "prob"). For example, by way of illustration purposes only, a relation between a person receiving a medical service or a person receiving food stamp having a probability as being 0.7 (e.g., 70 percent), while having a probability of 0.3 (e.g., 30 percent) for the relation mutually exclusive between the entity person and the entities medical or food stamp. The relation between the entities medical and food stamps as being mutually exclusive indicates a probability as being while the relation receiving a service between those two same entities is of 0.3 (see FIG. 5B).

The semantic decoder 540 receives, as input, a set of triples and outputs generated text data 530 (e.g., fragment of text or text output s'). In one aspect, a triples is a data entity composed of a subject, a predicate, and an object (e.g., three entities that codifies a statement about semantic data in the form of subject-predicate-object expressions), where subject and object are entities, and the predicate is a relation.

Turning now to FIG. 5B, to further illustrate, by way of example, consider the scenario where an input sentence 510 is transformed via the semantic encoder 520 into an uncertain knowledge graph 530 with probability distributions over edges by the semantic encoder 520. The semantic decoder 540 samples the triples from the uncertain knowledge graph 530 and decodes the triples back into generated text (e.g., decodes the triples back into sentences). The semantic decoder 540 outputs a fragment of text describing the knowledge representing the triples.

Figure 6A:
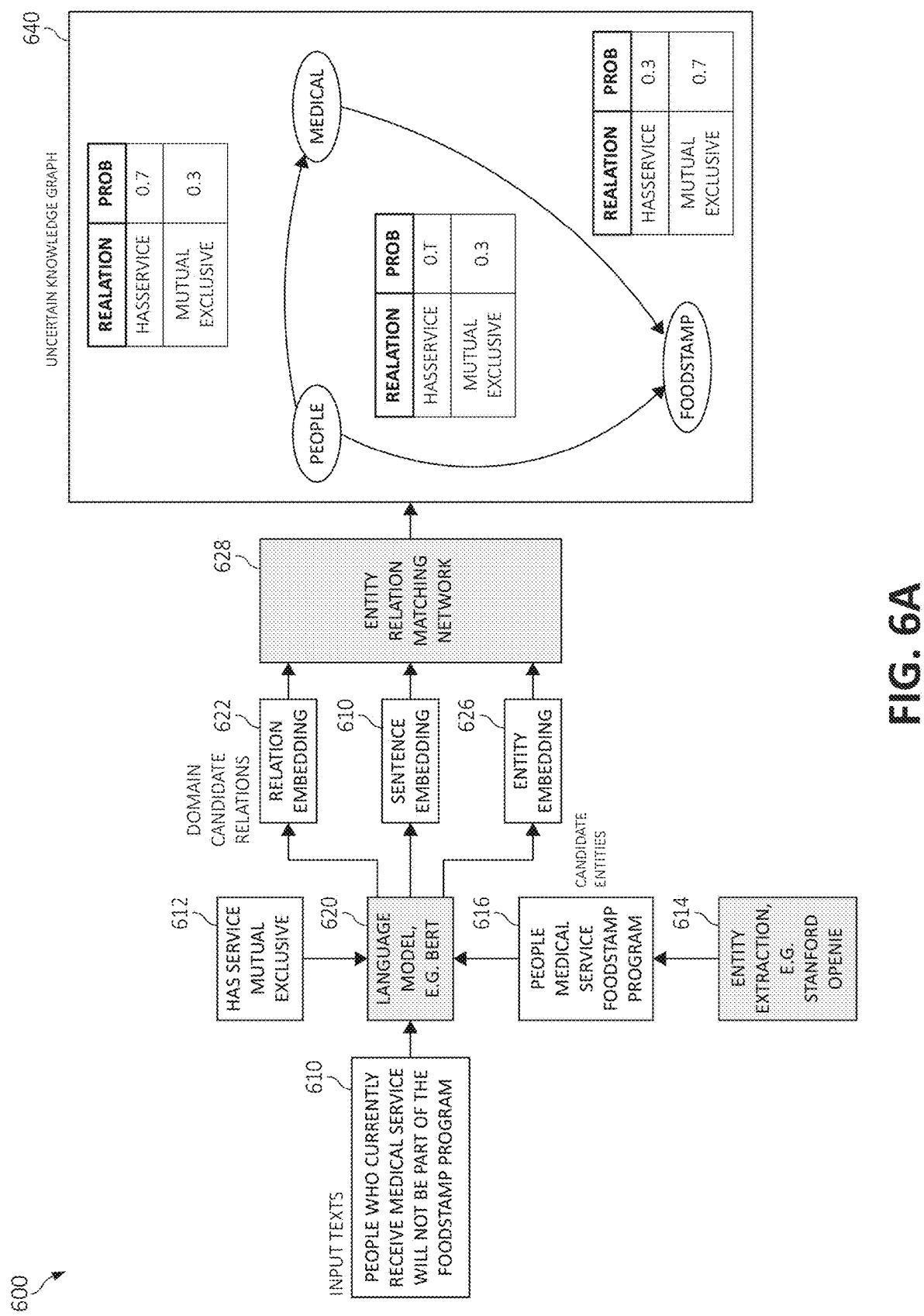
FIG. 6A is a block flow diagram depicting operations for using a semantic encoder in a computing environment according to an embodiment of the present invention.
Figure 6B:
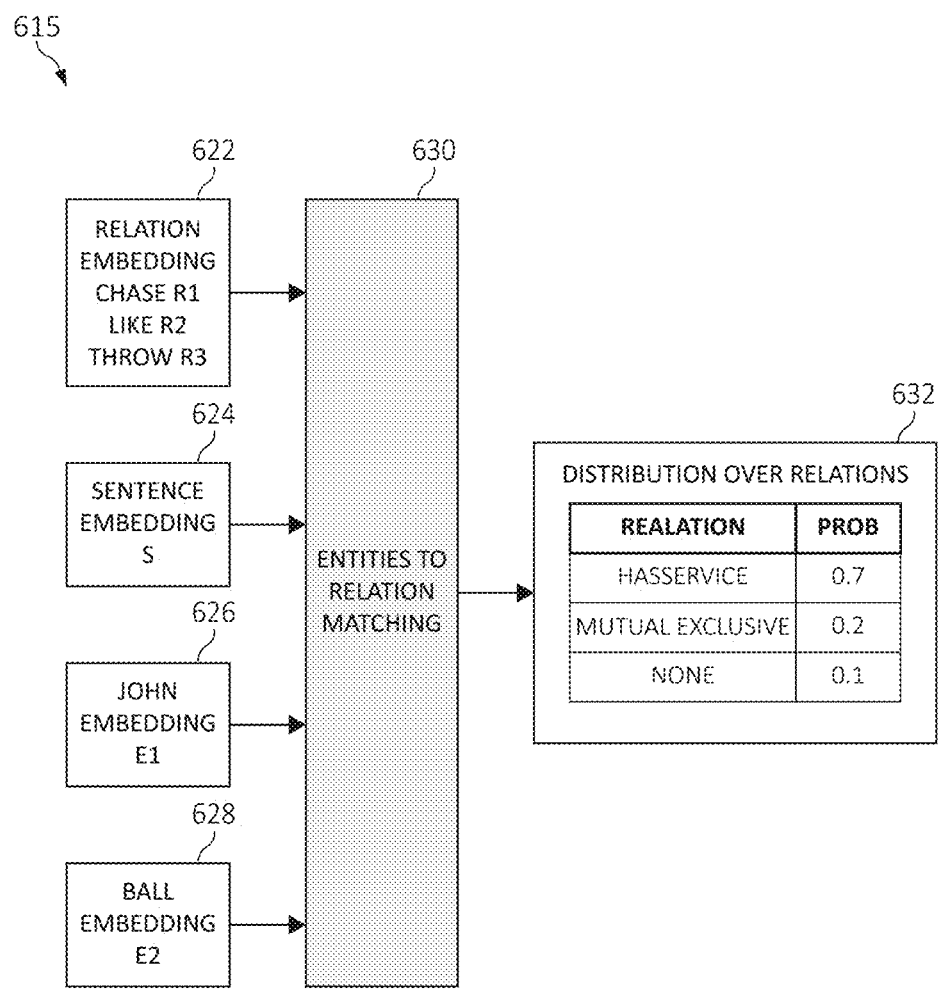
FIG. 6B is a block flow diagram depicting operations of an entity relation matching network in a computing environment according to an embodiment of the present invention.

For further explanation, FIG. 6A is a block flow diagram 600 depicting operations for using a semantic encoder in a computing environment according to an embodiment of the present invention. FIG. 6B is a block flow diagram 615 depicting operations of an entity relation matching network in a computing environment according to an embodiment of the present invention. Also, one or more components, functionalities, and/or features of FIGS. 1-5A-5B may be implemented in FIGS. 6A-6B. Repetitive description of like elements, components, modules, services, applications, and/or functions employed in other embodiments described herein is omitted for sake of brevity.

As depicted in FIG. 6A, a candidate entities extraction component 614 (e.g., a Stanford OpenIE) receives as input text 610 a fragment of text (e.g., people who currently receive medical service will not be part of the food stamp program) and outputs a list of candidate entities 616 mentioned and identified in the input text 610 (e.g., people, medical service, food stamp program). A semantic encoder 620 (e.g., a pretrained language model such as BERT or GPT-3 etc.) receives as input the input text 610 (e.g., a fragment of texts), the candidate entities 616, and candidate entities relations 612 and outputs vectors embeddings 622, 624, and 626 of the texts, the relations and the entities (e.g., relation embeddings 622, sentence embeddings 624, and entity embeddings 626).

Turning now to FIG. 6B, an entity relation matching network component 628 may turn/convert embeddings of the input texts, candidate relations and candidate entities (e.g., the relation embeddings 622, sentence embeddings 624, and entity embeddings 626) into distributions over relations/triple. That is, "distributions," here may refer to a probability distribution. For example, table 632 in FIG. 6B shows the probability distribution of relations where relations HASSERVICE has probability 0.7, MULTUALEX-CLUSSIVE has probability 0.2 and there is no relation between nodes has probability 0.1 (the sum of probabilities for these options always equal to 1.0)

Entity relation matching by the entity relation matching network component 628 transforms the embeddings of a pair entities (entity E1 and entity E2), embeddings of a sentence (S) and embeddings of relations (e.g., R1 (chase), R2 (like), R3 (throw) into a distributions over the relations. It should be noted that, by way example only, a special relation of "None" was added to the existing set of relations (e.g., has service, mutual exclusive, etc.) to indicate the case where there is no relations between entity E1 ("John") and entity E2 ("Ball").

Figure 7A:
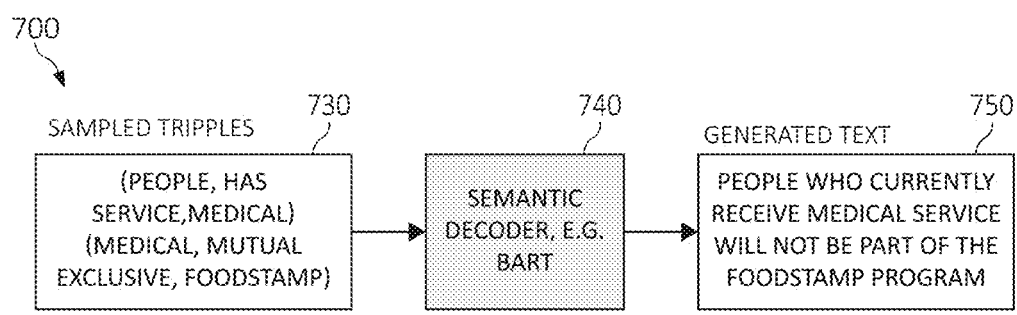
FIG. 7A-B are block flow diagram depicting operations for using a semantic decoder in a computing environment according to an embodiment of the present invention.
Figure 7B:
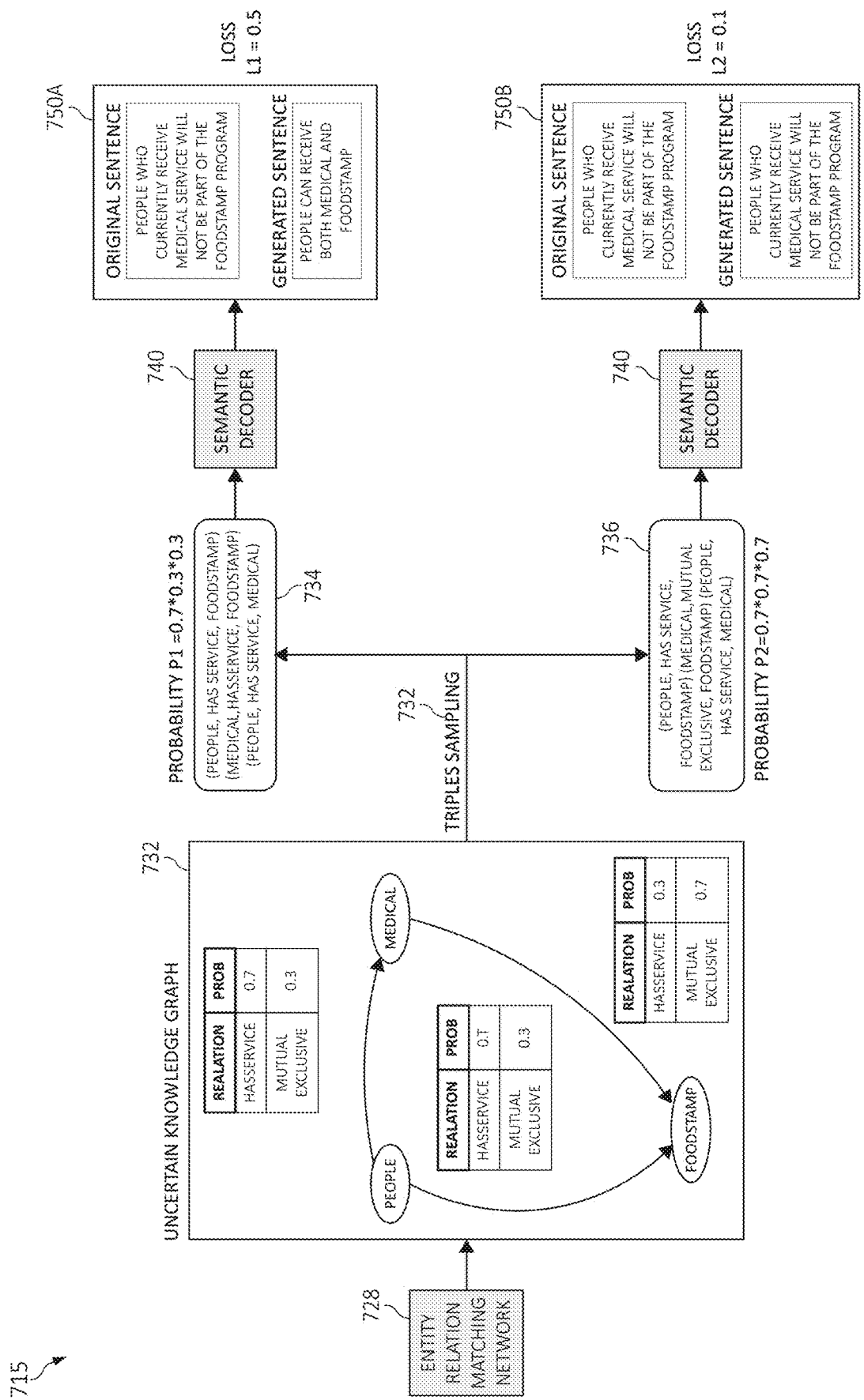

FIG. 7A-B are block flow diagrams 700 and 715 depicting operations for using a semantic decoder in a computing environment according to an embodiment of the present invention. Also, one or more components, functionalities, and/or features of FIGS. 1-6A-6B may be implemented in FIGS. 7A-7B. Repetitive description of like elements, components, modules, services, applications, and/or functions employed in other embodiments described herein is omitted for sake of brevity.

As depicted in FIG. 7A, a semantic decoder 740 receives a random set of sampled triples 730 and generates new text (e.g., generated text 750) that approximates the input text. Each of the components of the entire semantic encoding and language neural network, as described herein, is trained end-to-end to minimize the difference between the input sentences and the output sentences.

Since the semantic encoder (e.g., semantic encoder 520 of FIG. 5A) outputs an uncertain knowledge graph (e.g., uncertain knowledge graph 530 of FIG. 5A), the semantic decoder 740 takes as input a set of triples 730. Thus, a sampling operation is employed to sample a set of random triples from the uncertain knowledge graph (e.g., uncertain knowledge graph 530 of FIG. 5A).

With the sampling task in the middle of the pipeline (see FIG. 5A-5B), the two subnetworks the semantic encoder and semantic decoder (e.g., the s semantic encoder 520 of FIG. 5A and the semantic decoder 740), a reinforce operation is used to train the semantic encoding and language neural network (see FIG. 5A-5B). Considering the uncertain semantic graph as the distribution over policies, the reinforce operations can be used to learn the policies with the objective that minimizes a reconstruction loss, as depicted in FIG. 7B.

As depicted in FIG. 7B, the entity relation matching network component 728 turns/converts embeddings of the input texts, candidate relations and candidate entities (e.g., the relation embeddings 622, sentence embeddings 624, and entity embeddings 626) into distributions over relations/triple in an uncertain knowledge graphs 730 with triples and probabilities (e.g., a relation and probabilities "prob").

A sampling operation is used to sample the triples 732 from a current uncertain knowledge graph 730 predicted by the semantic encoder and then the sets of sampled triples are used as input to the semantic decoder 740 to output the texts such as, for example, text 750A and text 750B.

A loss may be determined between the input data (e.g., input sentence 510 of FIG. 5B), and out output text (e.g., output text 734 and 736) and is considered as penalty score to penalize the probability of the triples through which it adjusts the predicted probability given by the encoder to optimize the maximum likelihood objective.

To determine the reconstruction loss a minimization, reinforce loss operation may be applied. In one aspect, the minimize reinforce loss may be determine using equation 1:

$$\log(P1)*L1+\log(P2)*L2 \quad (1),$$

where L1 is a loss determined of a first reconstructed sentence (e.g., the output text 734) and L2 is a loss of a second reconstructed sentence (e.g., output text 736). When L2 is greater than L1, a minimum reinforce loss is achieved when a probability of one sampled triple (e.g., output text 734) is approximately zero (e.g., P1~0) is approximately zero, and a probability of a second sampled triple (e.g., output text 736) (e.g., P2~1) from which the model will raises the probability of triples (e.g., people, has service, medical), (medical, mutual exclusive, food stamp) decreases the probability of other triples. For example, when L2<L1 (e.g., L2 is less than L1), a minimum reinforce loss is achieved when P1~0 (P1 is approximately 0), and P2~1 (P2 is approximately 1) from which the model will raises the probability of triples (e.g., PEOPLE, HASSERVICE, MEDICAL), (e.g., MEDICAL, MUTUAL EXCLUSIVE, FOODSTAMP) while decreases the probability of other triples.

Figure 8:
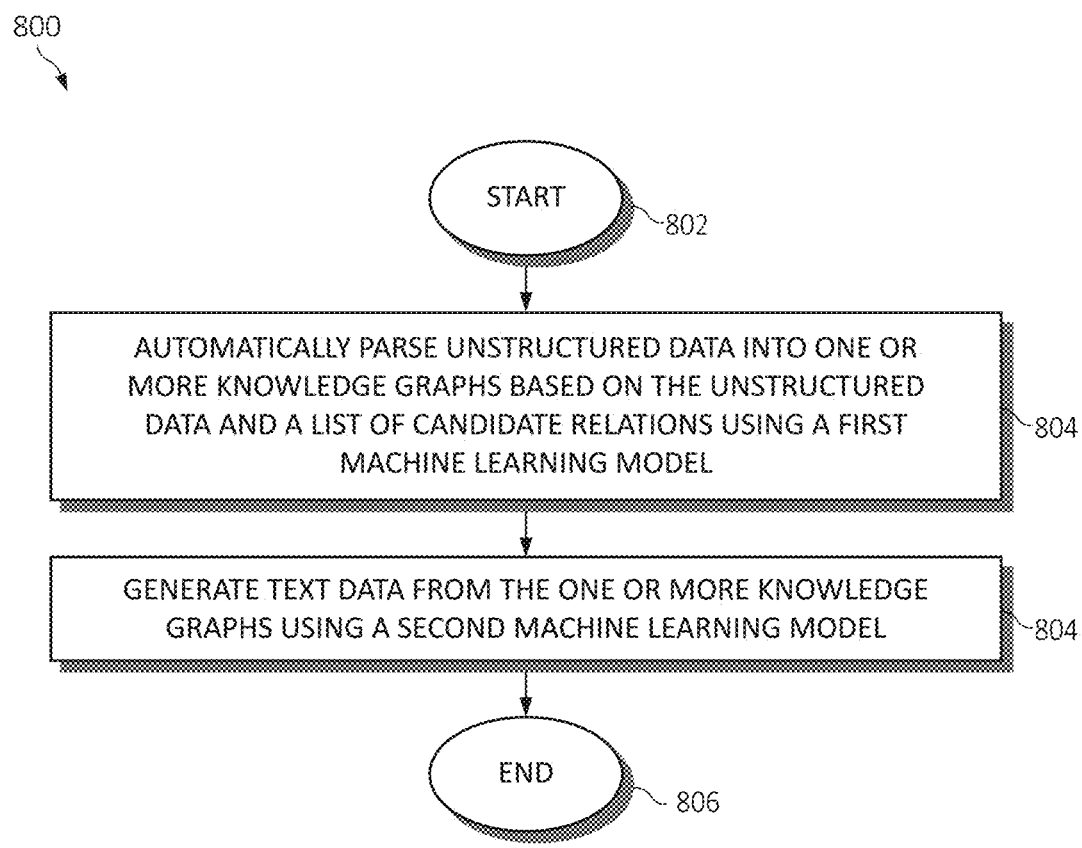
FIG. 8 is a flowchart diagram depicting an additional exemplary method for providing unsupervised learning of domain specific knowledge graph from textual data and language generation from knowledge graph via reinforcement learning in a semantic encoding and language neural network in a computing environment according to an embodiment of the present invention.

Turning now to FIG. 8, an additional method 800 for providing unsupervised learning of domain specific knowledge graph from textual data and language generation from knowledge graph via reinforcement learning in a semantic encoding and language neural network by one or more processors is depicted, in which various aspects of the illustrated embodiments may be implemented. The functionality 800 may be implemented as a method executed as instructions on a machine, where the instructions are included on at least one computer readable medium or one non-transitory machine-readable storage medium. As one of ordinary skill in the art will appreciate, the various steps depicted in method 800 may be completed in an order or version differing from the depicted embodiment to suit a particular scenario. The functionality 800 may start in block 802.

Unstructured data is automatically parsed into one or more knowledge graphs based on the unstructured data and a list of candidate relations using a first machine learning model, as in block 804. Text data is generated from the one or more knowledge graphs using a second machine learning model, as in block 806. The functionality 800 may end in block 808.

In one aspect, in conjunction with and/or as part of at least one block of FIGS. 8, the operations of method 800 may include each of the following. The operations of method 800 may train the first machine learning model and the second machine learning model using the unstructured data and a list of candidate relations via unsupervised machine learning using the unstructured data and the list of candidate relations, wherein the first machine learning model is a semantic encoder, and the second machine learning model is a semantic decoder.

The operations of method 800 may use the first machine learning model (e.g., a semantic encoder) to identify the plurality of entities in the unstructured data; and encode the unstructured data into a distribution of a plurality of triples in the one or more knowledge graphs. The operations of method 800 may use the second machine learning model (e.g., a semantic decoder) to identify a set of the plurality of triples of the one or more knowledge graphs; and decode the set of the plurality of triples into the text data, wherein a triple includes a subject, object, and predicate in the unstructured data, wherein the subject and object are an entity, and a predicate is a relation.

The operations of method 800 may sample a set of the plurality of triples from the unstructured data of one or more knowledge graphs for training a plurality of machine learning models via unsupervised machine learning. The operations of method 800 may generate text data from the set of the plurality of triples applying using the second machine learning model; and assign a penalty score to the set of the plurality of triples based on a degree of differences between the unstructured data and the text data. The operations of method 800 may identify one or more candidate entities in the unstructured data; and use the one or more candidate entities as nodes in the one or more knowledge graphs.

The operations of method 800 may identify semantic similarities between data in the one or more data sources and the plurality of triples from the knowledge graph; and associate the one or more candidate labels with the plurality of triples from the knowledge graph based on the semantic similarities. The operations of method 800 may generate semantic data from one or more input triples using the one or more reasonable language models, wherein the one or more reasonable language models approximates true labels for the one or more input triples and the semantic data describes the one or more input triples.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing semantic encoding and language generation in a computing system by a processor, comprising:

automatically parsing unstructured data into one or more knowledge graphs based on the unstructured data and a list of candidate relations using a first machine learning model;

encoding, using the first machine learning model, the unstructured data into a distribution of a plurality of triples based on the one or more knowledge graphs, wherein the encoding further comprises predicted probabilities of relations between entities in the unstructured data;

sampling, using a second machine learning model, a set of the plurality of triples from the unstructured data of the one or more knowledge graphs;

generating text data from the set of the plurality of triples using the second machine learning model;

computing a penalty score for the set of the plurality of triples based on a degree of difference between the unstructured data and the generated text data; and adjusting at least one predicted probability from the first machine learning model based on the determined penalty score.

2. The method of claim 1, further including training the first machine learning model and the second machine learning model using the unstructured data and the list of candidate relations via unsupervised machine learning, wherein the first machine learning model is a semantic encoder and the second machine learning model is a semantic decoder.

3. The method of claim 1, further including using the first machine learning model to:
identify the entities in the unstructured data.

4. The method of claim 1, further including using the second machine learning model to:
decode the set of the plurality of triples into the text data, wherein a triple includes a subject, object, and predicate in the unstructured data, wherein the subject and object are an entity and a predicate is a relation.

5. The method of claim 1, further including sampling the set of the plurality of triples from the unstructured data of the one or more knowledge graphs for training a plurality of machine learning models via unsupervised machine learning.

6. The method of claim 1, further including:
identifying one or more candidate entities in the unstructured data; and
using the one or more candidate entities as nodes in the one or more knowledge graphs.

7. A system for providing semantic encoding and language generation in a computing environment, comprising:
one or more computers with executable instructions that when executed cause the system to:
automatically parse unstructured data into one or more knowledge graphs based on the unstructured data and a list of candidate relations using a first machine learning model;
encode, using the first machine learning model, the unstructured data into a distribution of a plurality of triples based on the one or more knowledge graphs, wherein the encoding further comprises predicted probabilities of relations between entities in the unstructured data;
sample, using a second machine learning model, a set of the plurality of triples from the unstructured data of the one or more knowledge graphs;
generate text data from the set of the plurality of triples using the second machine learning model;
compute a penalty score for the set of the plurality of triples based on a degree of difference between the unstructured data and the generated text data; and
adjust at least one predicted probability from the first machine learning model based on the determined penalty score.

8. The system of claim 7, wherein the executable instructions when executed cause the system to train the first machine learning model and the second machine learning model using the unstructured data and the list of candidate relations via unsupervised machine learning, wherein the first machine learning model is a semantic encoder and the second machine learning model is a semantic decoder.

9. The system of claim 7, wherein the executable instructions when executed cause the system to use the first machine learning model to:
identify the entities in the unstructured data.

10. The system of claim 7, wherein the executable instructions when executed cause the system to use the second machine learning model to:
decode the set of the plurality of triples into the text data, wherein a triple includes a subject, object, and predicate in the unstructured data, wherein the subject and object are an entity and a predicate is a relation.

11. The system of claim 7, wherein the executable instructions when executed cause the system to sample the set of the plurality of triples from the unstructured data of the one or more knowledge graphs for training a plurality of machine learning models via unsupervised machine learning.

12. The system of claim 7, wherein the executable instructions when executed cause the system to:
identify one or more candidate entities in the unstructured data; and
use the one or more candidate entities as nodes in the one or more knowledge graphs.

13. A computer program product for providing semantic encoding and language generation in a computing environment, the computer program product comprising:
one or more tangible computer readable storage media, and program instructions collectively stored on the one or more tangible computer readable storage media, the program instruction comprising:
automatically parse unstructured data into one or more knowledge graphs based on the unstructured data and a list of candidate relations using a first machine learning model;
encode, using the first machine learning model, the unstructured data into a distribution of a plurality of triples based on the one or more knowledge graphs, wherein the encoding further comprises predicted probabilities of relations between entities in the unstructured data;
sample, using a second machine learning model, a set of the plurality of triples from the unstructured data of the one or more knowledge graphs;
generate text data from the set of the plurality of triples using the second machine learning model;
compute a penalty score for the set of the plurality of triples based on a degree of difference between the unstructured data and the generated text data; and
adjust at least one predicted probability from the first machine learning model based on the determined penalty score.

14. The computer program product of claim 13, further including program instructions to train the first machine learning model and the second machine learning model using the unstructured data and the list of candidate relations via unsupervised machine learning, wherein the first machine learning model is a semantic encoder and the second machine learning model is a semantic decoder.

15. The computer program product of claim 13, further including program instructions to use the first machine learning model to:
identify the entities in the unstructured data.

16. The computer program product of claim 13, further including program instructions to use the second machine learning model to:
decode the set of the plurality of triples into the text data, wherein a triple includes a subject, object, and predicate in the unstructured data, wherein the subject and object are an entity and a predicate is a relation.

17. The computer program product of claim 13, further including program instructions to:
identify one or more candidate entities in the unstructured data; and
use the one or more candidate entities as nodes in the one or more knowledge graphs.

\* \* \* \* \*